Dec. 5, 1944.  H. M. HUGE  2,364,531
FREQUENCY REDUCER
Filed May 8, 1942
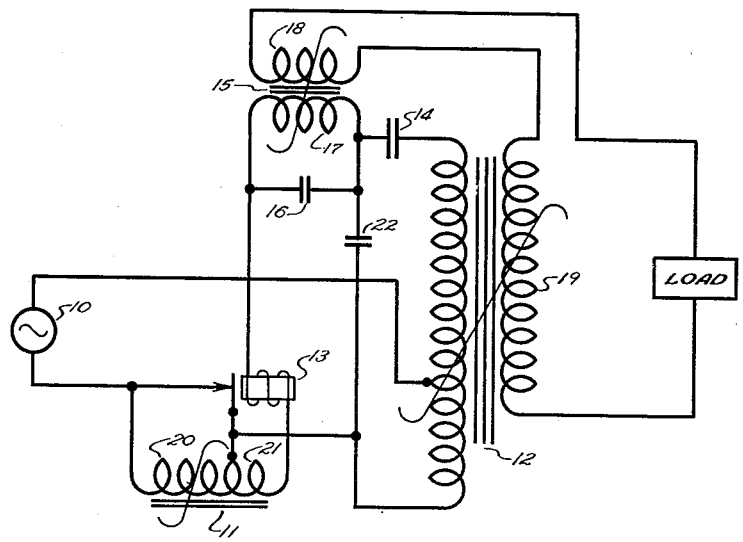
INVENTOR.
Henry M. Huge
BY Woodling and Krost
ATTORNEYS.

Patented Dec. 5, 1944

2,364,531

UNITED STATES PATENT OFFICE 2,364,531

FREQUENCY REDUCER

Henry M. Huge, Lorain, Ohio, assignor of one-half to Closman P. Stocker and one-half to E. M. Heavens Application May 8, 1942, Serial No. 442,224

10 Claims. (Cl. 172—281)

This invention deals with the generation of harmonics, and in particular with a system for introducing harmonics into the output voltage of a frequency changer.

It is an object of this invention to introduce harmonics into the output voltage of a frequency changer, and to control the amplitude and the frequencies of the harmonics.

A further object of this invention is to introduce harmonics into the output voltage of a frequency changer without appreciably increasing the ratio of peak voltage to effective voltage.

A still further object is to maintain the amplitude of the harmonics as the load current increases.

Another object of this invention is to utilize a saturable magnetic unit to generate harmonics in the output voltage of a frequency changer and to control the saturation of this magnetic unit with currents from two different circuits.

Other objects and a better understanding of my invention may be had by referring to the following specification and claims, in conjunction with the accompanying drawing which comprises but one figure and shows my invention as applied to a subharmonic generator of a type described in U. S. Patent No. 2,179,386, issued November 7, 1939, to C. P. Stocker, and is an improvement on the harmonic generating system described in U. S. Patent No. 2,088,618, issued August 3, 1937, to C. P. Stocker.

With particular reference to the accompanying drawing, there is shown a subharmonic generator comprising saturable auto-transformer 11, saturable output transformer 12 and capacitor 14 connected to a source of alternating current 10. Relay 13 serves to start the oscillations in the manner described in the patents previously mentioned. The saturable auto-transformer 11 has two windings, winding 20 carrying the input current and winding 21 carrying current from capacitor 14.

The current through capacitor 14 includes components of the frequency of source 10 and of the output frequency. A large part of the current through capacitor 14 passes through winding 17 of saturable transformer 15, saturating its core and producing a peaked voltage wave across windings 17 and 18. Capacitors 16 and 22 are charged by the peaked voltage and their discharge is of an oscillatory nature. The frequency of the damped oscillation, and consequently of the harmonic introduced in the output voltage is controlled by the size of the capacitors 16 and 22 and by the impedance of transformer 15. The damped oscillation is normally started when the output voltage is at its crest value, and if winding 18 is omitted the surge of voltage produced by the reversal of flux in transformer 15 increases the peak value of the output voltage. When the high peak value of output voltage is objectionable, winding 18 is phased to reverse the initial peak of the damped oscillation.

Since the second half cycle of the oscillation is somewhat smaller than the first and occurs after the output voltage has passed its peak, I am thus able by my invention to introduce harmonics into the output voltage without increasing the ratio of peak to effective voltage above the value it would have if no harmonics were present.

At the same time, I am able to maintain the amplitude of the harmonics at least at its no load level for all values of load current by taking advantage of the effect of load current on the saturation of transformer 15.

Although I show two capacitors, 16 and 22, as taking part in producing the damped oscillations, the oscillations can be produced by either one of the capacitors alone and the other one may thus be omitted. Where the frequency of the harmonics generated by saturable inductance element 15 is not critical both capacitors 16 and 22 may be omitted.

Capacitor 22 in series with capacitor 14 completes a path in shunt with output transformer 12 to shunt the high harmonics of frequencies higher than those required in the output voltage.

Although I have described my invention with a certain degree of particularity it is understood that numerous changes in the details of construction and the combination and arrangement of parts may be resorted to without departing from the spirit and scope of the invention as hereinafter claimed.

I claim as my invention:

1. A circuit for introducing harmonics into the output voltage of a frequency changer having an output transformer with an output winding thereon, said circuit comprising in combination, a first capacitor substantially in parallel with said output transformer, a saturable inductance element in series with said first capacitor and winding means on said saturable inductance element connected in series with the output winding of said output transformer.

2. The combination with a static frequency changer having an output transformer connected substantially in parallel relationship with a first capacitor, said output transformer having winding means, of a circuit for producing harmonics and for introducing voltage of these harmonics into the output voltage of said frequency changer, said circuit comprising a saturable inductance element in series with said first capacitor, said saturable inductance element having winding means, and output circuit means including the winding means on said output transformer connected in series relation with the winding means on said saturable inductance element.

3. The combination with a frequency changer having an output circuit comprising a first capacitor in parallel with an output transformer, of a circuit for introducing harmonics into the output voltage of said frequency changer comprising in combination, a saturable inductance element and a second capacitor, said saturable inductance element being connected in series with said first capacitor and producing a peaked voltage wave, said second capacitor being energized by said peaked voltage wave, and output means adapted to supply a load with voltage from said output transformer and said saturable inductance element in series, and winding means on said saturable inductance for controlling the phase of the harmonics introduced into said output means.

4. The combination with a frequency changer having a first capacitor and an output transformer, of a circuit for introducing damped oscillations into the output of said frequency changer comprising a saturable inductance element in series with said first capacitor and energized by current flowing through said first capacitor, a second capacitor substantially in parallel with said saturable inductance element, and output means on both the output transformer and the saturable inductance element connected to supply a load with voltage from both the output transformer and the saturable inductance element.

5. Circuit means for introducing harmonics into the output of a frequency changer having a capacitor and an output circuit, said circuit means comprising in combination, a saturable inductance having a plurality of winding means, one of said plurality of winding means being connected in series with said capacitor, another of said plurality of winding means being connected in said output circuit, said plurality of winding means magnetizing said saturable inductance and controlling the phase of the harmonic voltages with respect to the output voltage supplied by the frequency changer.

6. Circuit means for introducing harmonics into the output of a frequency changer having a capacitive oscillation circuit including a capacitor and an output circuit, said circuit means comprising, in combination, a saturable inductance having a plurality of winding means, one of said plurality of winding means being connected to said capacitor in said capacitive oscillation circuit, another of said plurality of winding means being connected in said output circuit.

7. Circuit means for introducing harmonics into the output of a frequency changer having a capacitive oscillation circuit including a first capacitor and an output circuit, said circuit means comprising, in combination, a saturable inductance having a plurality of winding means, a second capacitor connected substantially in parallel with said saturable inductance, one of said plurality of winding means being connected to said first capacitor in said capacitive oscillation circuit, another of said plurality of winding means being connected in said output circuit.

8. In a frequency changer having a first saturable inductive element and a capacitor energized from a source of alternating current and adapted to supply a changed frequency to a load, harmonic generating means comprising a second saturable inductive element, said second saturable element being energized in series with the capacitor and having winding means connected in series with the load.

9. Circuit means for introducing harmonics into the output of a frequency changer having magnetic core means with first and second winding means substantially in parallel thereon, and having a capacitor connected to the first winding means, said circuit means comprising, in combination, a saturable inductance having a plurality of winding means, one of said plurality of winding means being connected in series with said capacitor, another of said plurality of winding means being connected to said second winding means on the magnetic core means to introduce voltage from the saturable inductance into the output voltage of the frequency changer.

10. Circuit means for introducing harmonics into the output of a frequency changer having magnetic core means with first and second winding means substantially in parallel thereon, and having a first capacitor connected to the first winding means, said circuit means comprising, in combination, a saturable inductance having a plurality of winding means, a second capacitor connected substantially in parallel with said saturable inductance, one of said plurality of winding means being connected in series with said capacitor, another of said plurality of winding means being connected to said second winding means on the magnetic core means to introduce voltage from the saturable inductance into the output voltage of the frequency changer.

HENRY M. HUGE.